United States Patent
Hashida et al.

(10) Patent No.: US 10,336,521 B2
(45) Date of Patent: Jul. 2, 2019

(54) FILM FOR PACKAGING AND PACKAGING BAG

(71) Applicant: TOYOBO CO., LTD., Osaka-shi, Osaka (JP)

(72) Inventors: Tomoyuki Hashida, Osaka (JP); Yosuke Otani, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 151 days.

(21) Appl. No.: 15/532,835

(22) PCT Filed: Nov. 20, 2015

(86) PCT No.: PCT/JP2015/082713
§ 371 (c)(1),
(2) Date: Jun. 2, 2017

(87) PCT Pub. No.: WO2016/088581
PCT Pub. Date: Jun. 9, 2016

(65) Prior Publication Data
US 2017/0355497 A1    Dec. 14, 2017

(30) Foreign Application Priority Data

Dec. 2, 2014   (JP) .................................. 2014-243693
May 21, 2015   (JP) .................................. 2015-103393

(51) Int. Cl.
*B65D 65/02*     (2006.01)
*B32B 1/02*      (2006.01)
(Continued)

(52) U.S. Cl.
CPC ................ *B65D 65/02* (2013.01); *B32B 1/02* (2013.01); *B32B 1/08* (2013.01); *B32B 27/36* (2013.01);
(Continued)

(58) Field of Classification Search
CPC .. B32B 1/02; B32B 1/08; B32B 27/36; B29C 55/005; B65D 65/00; B65D 65/02;
(Continued)

(56) References Cited

U.S. PATENT DOCUMENTS 5,935,686  A     8/1999  Daelmans et al.
2005/0019595 A1  1/2005  Kim et al.
(Continued)

FOREIGN PATENT DOCUMENTS

AU     751843 B2      8/2002
DE   10015634 A1     10/2001
(Continued)

OTHER PUBLICATIONS

American Society for Testing Materials, "Standard Method of Test for Crease Retention of Wrapping Paper," American Society for Testing Materials (ASTM) Standard No. D 920-49, pp. 1003-1005 (1949).
(Continued)

*Primary Examiner* — Walter Aughenbaugh
(74) *Attorney, Agent, or Firm* — Leydig, Voit & Mayer, Ltd.

(57) ABSTRACT

It is provided that a film for packaging and a packaging bag that can suppress diffusion of odor to hold the twisted state even after placing an object at the center of a film, wrapping the object, twisting the upper part of the object and leaving it for a certain time. The film of the present invention is the film for packaging comprising a resin film, wherein the twist holding angle is 400 degrees or more.

13 Claims, 1 Drawing Sheet

(51) Int. Cl.
  *B32B 1/08* (2006.01)
  *B65D 65/12* (2006.01)
  *B32B 27/36* (2006.01)
  *B65D 65/10* (2006.01)
  *B65D 65/16* (2006.01)
  *B65D 65/22* (2006.01)
  *C08J 5/18* (2006.01)
  *B65D 65/40* (2006.01)
  *B65D 81/30* (2006.01)
  *B65D 75/10* (2006.01)

(52) U.S. Cl.
  CPC ............ *B65D 65/10* (2013.01); *B65D 65/12* (2013.01); *B65D 65/16* (2013.01); *B65D 65/22* (2013.01); *B65D 65/40* (2013.01); *B65D 75/10* (2013.01); *B65D 81/30* (2013.01); *C08J 5/18* (2013.01); *C08J 2367/02* (2013.01); *C08J 2367/03* (2013.01); *C08J 2423/12* (2013.01); *C08J 2425/06* (2013.01); *C08J 2467/02* (2013.01)

(58) Field of Classification Search
  CPC ........ B65D 65/10; B65D 65/12; B65D 65/16; B65D 65/22; B65D 75/10
  See application file for complete search history.

(56) References Cited

U.S. PATENT DOCUMENTS

| | | |
|---|---|---|
| 2008/0193783 A1 | 8/2008 | Imai et al. |
| 2013/0210621 A1 | 8/2013 | Topolkaraev et al. |

FOREIGN PATENT DOCUMENTS

| | | |
|---|---|---|
| JP | H10-166529 A | 6/1998 |
| JP | H10-278192 A | 10/1998 |
| JP | 2004-181653 A | 7/2004 |
| JP | 2006-187886 A | 7/2006 |
| JP | 2007-203652 A | 8/2007 |
| JP | 2007-301846 A | 11/2007 |
| JP | 4308662 B2 | 8/2009 |
| JP | 2015-134491 A | 7/2015 |
| WO | WO 1997/024273 A1 | 7/1997 |
| WO | WO 1999/038685 A1 | 8/1999 |

OTHER PUBLICATIONS

European Patent Office, Extended European Search Report in European Patent Application No. 15864939.2 (dated Jul. 9, 2018).
Chinese Patent Office, Notification of First Office Action in Chinese Patent Application No. 201580065843.2 (dated Sep. 5, 2018).
Japanese Patent Office, International Search Report in International Patent Application No. PCT/JP2015/082713 (dated Dec. 22, 2015).

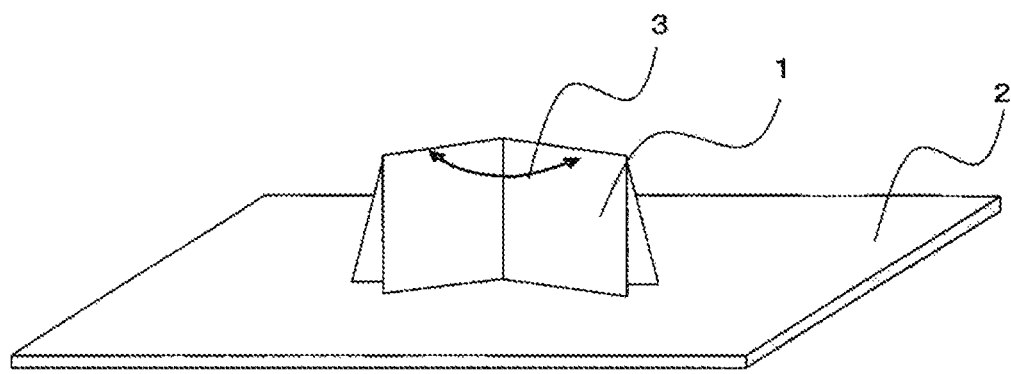

FILM FOR PACKAGING AND PACKAGING BAG

CROSS-REFERENCE TO RELATED APPLICATIONS

This patent application is the U.S. national phase of International Patent Application No. PCT/JP2015/082713, filed Nov. 20, 2015, which claims the benefit of Japanese Patent Application No. 2014-243693, filed on Dec. 2, 2014, and Japanese Patent Application No. 2015-103393, filed on May 21, 2015, which are incorporated by reference in their entireties herein.

TECHNICAL FIELD

The present invention relates to a film for packaging and a packaging bag that can suppress diffusion of odor.

BACKGROUND ART

When an object is wrapped in a polyethylene film, an aroma retaining property (odor suppressing effect) of the film itself is not sufficient, and when an object wrapped in a film is strongly odorous, an odor leaks through the polyethylene film. On the other hand, a polyester film has an aroma retaining property, thus an odor hardly passes through the film. For example, a film having a certain degree of twistability even after twist packaging is carried out and left for a certain time, like a polyester film of Patent Document 1, has been known.

However, in the polyester film of Patent Document 1, when an object is placed at the center of the film, and wrapped, and the upper part of the object is twisted, and left for a certain time, twistability is insufficient, thus a twisted part is slightly opened, and when the object wrapped in the film is strongly odorous, an odor leaks. Also, when a subject to be wrapped in a film is relatively large, use of a film formed into a bag is also considered. However, the melting point of the polyester film of Patent Document 1 is high, thus polyester films cannot be bonded each other by heat sealing as they are, and a sealant layer or the like needs to be provided inside.

PRIOR ART DOCUMENT

Patent Document

Patent Document 1: JP-A-2004-181653

DISCLOSURE OF THE INVENTION

Problems to Be Solved By the Invention

An object of the present invention is to provide a film for packaging in which the twisted state is held (hereinafter, referred to as having twist holding property) even after placing an object at the center of a film, wrapping the object, twisting the upper part of the object and leaving it for a certain time, aroma retaining property (odor suppressing effect) is excellent, and heat shrinkage under a high temperature environment is suppressed.

Solutions to the Problems

The film for packaging of the present invention is a film for packaging comprising a resin film, and the twist holding angle measured by the method defined in the description is 400 degrees or more.

It is preferable that the heat shrinkage rates in the longitudinal and width directions of the film when the film is heat-shrunk in hot water at 95° C. for 10 seconds are 5% or more and 20% or less.

It is preferable that the resin film is a polyester film.

It is preferable that the resin film comprises ethylene terephthalate as a main constituent unit, the total of units derived from a polyhydric alcohol other than ethylene glycol and units derived from a polycarboxylic acid other than terephthalic acid is 10% by mol or more in 100% by mol of the total constituent units of the polyester, and the film comprises a polyester-based resin containing neopentyl glycol and/or 1,4-cyclohexanedimethanol, as a monomer that can be an amorphous component.

It is preferable that the fold holding angle of the resin film after being kept in an environment at 20° C. for one day is 75 degrees or less. It is preferable that the total light transmittance of the resin film is 40% or less.

In addition, the present invention includes a packaging bag formed into a bag by heat sealing the film for packaging.

Furthermore, the present invention includes a packaging bag for the purpose of packaging a strongly odorous object.

Effect of the Invention

The film for packaging of the present invention has a twist holding angle in the evaluation method of a twist holding property described below of 400 degrees or more, and has sufficient twist holding property. Also, the film for packaging of the present invention is excellent in aroma retaining property of the film itself. Therefore, an odor does not leak even when a strongly odorous object is packaged in the film of the present invention, and the film of the present invention is useful as a film for packaging. In addition, the film for packaging of the present invention has heat sealability, thus when a subject to be wrapped in a film is relatively large, a film itself can be also formed into a bag by heat sealing the film, and used.

BRIEF DESCRIPTION OF THE DRAWINGS

The FIGURE is a diagram showing a method for measuring a fold holding angle of a film.

MODE FOR CARRYING OUT THE INVENTION

The film for packaging of the present invention (hereinafter, may be simply referred to as film) comprises a resin film. As a resin used in a resin composition forming the resin film, it is preferred to contain at least one kind of a polyester resin, a polypropylene resin, a polyethylene resin and a polyamide resin, it is more preferred to contain a polyester resin from the viewpoint of suppressing odor leakage from the film, and it is further preferred that the resin composition comprises a polyester resin (the film is a polyester film).

The polyester resin preferably contains an ethylene terephthalate unit as a main constituent component. The term "main" means that an ethylene terephthalate unit is contained in an amount of more than 50% by mol, based on 100% by mol of the total constituent units of the polyester. The ethylene terephthalate unit is more preferably 55% by mol or more, and further preferably 60% by mol or more.

The polyester resin preferably contains units derived from a polyhydric alcohol other than ethylene glycol and/or units derived from a polycarboxylic acid other than terephthalic acid.

Examples of the polyhydric alcohol other than ethylene glycol include aliphatic diols such as propylene glycol, diethylene glycol, triethylene glycol, 1,4-butanediol, 1,6-hexanediol, 3-methyl-1,5-pentanecliol, neopentyl glycol, 2-methyl-1,5-pentanecliol, 2,2-diethyl-1,3-propanediol, 1,9-nonanecliol and 1,10-decanecliol; alicyclic diols such as 1,4-cyclohexanedimethanol and 1,4-cyclohexanediethanol; aliphatic polyhydric alcohols such as trimethylolpropane and pentaerythritol; and the like.

Also, examples of the polycarboxylic acid other than terephthalic acid include aromatic dicarboxylic acids such as isophthalic acid, naphthalene-1,4- or -2,6-dicarboxylic acid, 5-sodium sulfoisophthalic acid, 4,4'-cliphenyldicarboxylic acid and diphenylsulfoclicarboxylic acid; aliphatic dicarboxylic acids such as glutaric acid, adipic acid, sebacic acid, azelaic acid, oxalic acid and succinic acid, and those usually called as dimer acid; aromatic polycarboxylic acids such as trimellitic acid and pyromellitic acid and acid anhydrides thereof; and the like.

Also, the total amount of units derived from a polyhydric alcohol other than ethylene glycol and units derived from a polycarboxylic acid other than terephthalic acid is preferably 10% by mol or more, and more preferably 13% by mol or more, in 100% by mol of the total constituent units. The units derived from a polyhydric alcohol other than ethylene glycol and/or units derived from a polycarboxylic acid other than terephthalic acid can be amorphous components. In the present invention, from the viewpoint of improving twist holding property, an amorphous unit is preferably contained in the constituent unit of the polyester. Therefore, as a polyhydric alcohol, diethylene glycol, neopentyl glycol and 1,4-cyclohexanedimethanol are preferably used, and neopentyl glycol and/or 1,4-cyclohexanedimethanol is more preferably used. Also, in the present invention, isophthalic acid is preferably used as a polycarboxylic acid, such that an amorphous unit is contained in the constituent unit of the polyester.

In addition, the total amount of units derived from a polyhydric alcohol other than ethylene glycol and units derived from a polycarboxylic acid other than terephthalic acid is preferably 30% by mol or less, and more preferably 27% by mol or less, in 100% by mol of the total constituent units. When the total amount of units derived from a polyhydric alcohol other than ethylene glycol and units derived from a polycarboxylic acid other than terephthalic acid exceeds 30% by mol, impact resistance of the film to be obtained may be insufficient, and breakage resistance of the film may be lowered.

To a resin forming the film of the present invention, various additives, for example, waxes, an antioxidant, an antistatic agent, a nucleating agent, a viscosity-reducing agent, a thermal stabilizer, a pigment for coloring, a coloring-preventing agent, an ultraviolet absorber and the like can be added, as necessary. In addition, fine particles as a lubricant that improves workability (slipperiness) of the film are preferably added. Arbitrary one can be selected as fine particles. Examples of inorganic fine particles include silica, alumina, titanium dioxide, calcium carbonate, kaolin, barium sulfate and the like, and examples of organic fine particles include acrylic resin particles, melamine resin particles, silicone resin particles, crosslinked polystyrene particles and the like. The average particle size of the fine particles is within the range of 0.05 to 3.0 µm (when measured with a coulter counter), and can be properly selected as necessary. A method for blending the fine particles to a resin forming a polyester film can also adopt the same method as above.

As the method for blending the fine particles to a resin forming the film of the present invention, for example, the fine particles can be added in an arbitrary stage during the production of a polyester-based resin, but it is preferred to add the fine particles as slurry dispersed in ethylene glycol or the like in the esterification stage or the stage after the completion of the transesterification and before the start of the polycondensation reaction, and the polycondensation reaction is allowed to proceed. It is also preferred to blend the fine particles by a method of blending slurry of particles dispersed in ethylene glycol or water and polyester-based resin raw materials using a vented kneading extruder, a method of blending dried particles and polyester-based resin raw materials using a kneading extruder, or the like.

The twist holding angle of the film of the present invention is 400 degrees or more, preferably 410 degrees or more, and more preferably 420 degrees or more. When the twist holding angle is less than 400 degrees, in a case where a strongly odorous object is packaged in a film, an odor may leak from a twisted part. The twist holding angle refers to a twisting angle measured after cutting out a film in 30 cm×30 cm square, placing a tennis ball with a diameter of 6.6 cm at the center, wrapping the tennis ball and twisting it 1.5 times (540 degrees) (carrying out twist packaging), and then leaving it in an environment of 23° C. and 50% RH for 1 hour.

In the film of the present invention, the fold holding angle after being kept in an environment at 20° C. for one day (hereinafter, referred to as fold holding angle) is preferably 20 degrees or more and 75 degrees or less, more preferably 55 degrees or less, further preferably 50 degrees or less, further more preferably 45 degrees or less, particularly preferably 40 degrees or less, and most preferably 35 degrees or less. At 75 degrees or less, even when a film is folded, the film can be held in the folded state (hereinafter, referred to as dead holding property), thus odor leakage from a folded opening can be also suppressed by folding the film. In addition, odor leakage can be more surely suppressed by twisting and folding the film. The method for measuring a fold holding angle will be described later.

The thickness of the film of the present invention is preferably 10 µm or more and 50 µm or less. The thinner the thickness of the film, the larger the twist holding angle. However, when the thickness of the film is thinner than 10 µm, processing may be difficult, an aroma retaining property of the film is lowered, and an odor of the object wrapped in the film is likely to leak. When the thickness of the film is thicker than 50 µm, the twist holding angle of the film may be reduced, and the heat sealability may be lowered. The thinner the thickness of the film, the twist holding angle tends to be small, thus the thickness of the film is more preferably 45 µm or less, and further preferably 40 µm or less. In addition, the thickness of the film is more preferably 11 µm or more, further preferably 12 µm or more, and most preferably 15 µm or more.

The film of the present invention may be a film having large heat shrinkage rate or small heat shrinkage rate, and should be properly selected according to applications. When a film is treated in hot water at 95° C. in a no-load state over 10 seconds, from the length of before and after shrinkage, the heat shrinkage rate in the longitudinal direction (main shrinkage direction) of the film calculated from the following formula is preferably 5% or more and 20% or less, more preferably 8% or more and 16% or less, and further preferably 10% or more and 14% or less. Also, the heat shrinkage rate in the width direction of the film is preferably 5% or more and 20% or less, more preferably 8% or more and 16% or less, and further preferably 10% or more and 14% or less. When the heat shrinkage rates in the longitudinal direction (vertical direction) and width direction (horizontal direction) in the film are within the above ranges, a film is hardly shrunk even when the film is placed under a high temperature environment, thus a work that the temperature of a film becomes high, like printing on a film, can be performed. Specific method of measuring heat shrinkage rate will be described later.

Heat shrinkage rate={(Length before shrinkage−Length aftershrinkage)/Length before shrinkage}×100(%)

When the film of the present invention is a transparent film, the total light transmittance is preferably 90% or more. Since transparency is reduced at a total light transmittance of less than 90%, a use in applications requiring transparency may be restricted.

The total light transmittance is measured by the following measurement method. At different three points in the obtained stretched film, the total light transmittance is measured using a hazemeter ("NDH 2000" manufactured by NIPPON DENSHOKU INDUSTRIES CO., LTD), by a method according to JIS K 7136, and the average thereof is used as a total light transmittance of the stretched film.

On the other hand, in applications to disposal of used diaper and filth and the like, translucent and opaque films are also requested, and for example, the film may be a white film, or a film with pearly appearance or frosted glass-like appearance. In the case of this film, the total light transmittance is preferably 40% or less, and more preferably 30% or less. In order to improve concealing property of the film, it is preferred to contain fine cavities inside the film. For example, a foamed material or the like may be mixed and extruded, but as a preferred method, cavities are obtained by mixing a thermoplastic resin incompatible with polyester in the polyester and stretching the mixture at least in a uniaxial direction. The thermoplastic resin incompatible with the polyester used in the present invention is arbitrary, and is not particularly limited as long as those incompatible with polyester. Specific examples include polystyrene-based resins, polyolefin-based resins, polyacrylic-based resins, polycarbonate-based resins, polysulfone-based resins, cellulose-based resins, and the like. Particularly, in terms of cavity formability, a polystyrene-based resin or a polyolefin-based resin such as polymethylpentene-based resin or polypropylene-based resin is preferable.

The polystyrene-based resin refers to a thermoplastic resin containing a polystyrene structure as a basic constituent element, and includes, in addition to homopolymers such as atactic polystyrene, syndiotactic polystyrene and isotactic polystyrene, modified resins obtained by graft- or block-copolymerizing other components, for example, impact-resistant polystyrene resins, modified polyphenylene ether resins and the like, furthermore, thermoplastic resins having compatibility with these polystyrene-based resins, for example, mixtures with polyphenylene ether.

The polymethylpentene-based resin refers to a polymer having a unit derived from 4-methylpentene-1 in 80% by mol or more, and preferably 90% by mol or more, and units derived from ethylene, propylene, butene-1,3-methylbutene-1 or the like are exemplified as other components. The melt flow rate of the polymethylpentene is preferably 200 g/10 minutes or less, and further preferably 30 g/10 minutes or less. This is because the effect of low specific gravity of the film is hardly obtained when the melt flow rate exceeds 200 g/10 minutes.

The polypropylene-based resin as a thermoplastic resin incompatible with polyester also includes, not only homopolymers such as atactic polystyrene and syndiotactic polystyrene, but also modified resins obtained by graft- or block-copolymerizing other components.

The thermoplastic resin incompatible with polyester is present in the form of being dispersed in various shapes such as spherical shape, ellipsoidal shape, or filamentous shape in polyester. To the mixture of the polyester and the thermoplastic resin incompatible with the polyester can be added various additives and the like as necessary, as described above. Also, fine particles as a lubricant that improves workability (slipperiness) of the film and fine particles as a concealment aid that reduces the total light transmittance (increases haze) are preferably added. Arbitrary one can be selected as fine particles. Examples can include the inorganic fine particles described above, the organic fine particles described above, and the like. The average particle size of the fine particles is within the range of 0.05 to 3.0 μm (when measured with a coulter counter), and can be properly selected as necessary. A method for blending the fine particles to a resin forming a polyester film can also adopt the same method as above.

When the film of the present invention is a transparent film, the density is preferably 1.29 g/cm$^3$ or more and 1.33 g/cm$^3$ or less. When the density exceeds 1.33 g/cm$^3$, it may be a film with poor dead holding property and thickness unevenness.

On the other hand, when the film of the present invention has cavities inside, and is a translucent or opaque film, the density is preferably 0.95 g/cm$^3$ or more and 1.25 g/cm$^3$ or less. When the density exceeds 1.25 g/cm$^3$, it may be a film with poor dead holding property and thickness unevenness. When the density is less than 0.95 g/cm$^3$, it is not very preferable since the number of cavities may increase, and the strength of the film may decrease.

The density is measured by the following measurement method. Using a density gradient tube containing a liquid (aqueous calcium nitrate solution) having a continuous density gradient in the tube, a sample is put into the liquid for 24 hours, then the density of the sample is read from the equilibrium position that is static in the liquid.

When the film of the present invention can be obtained by melt-extruding the polyester raw materials described above with an extruder to form an unstretched film, and uniaxially stretching or biaxially stretching the unstretched film in the prescribed manner shown below. Here, polyester can be obtained by polycondensing the preferred dicarboxylic compound and polyhydric alcohol component described above by a known method. Also, two kinds or more chip-shaped polyester are mixed and can be used as the raw material of a film.

When the raw material resin is melt-extruded, it is preferred to dry polyester raw materials using a drier such as a hopper drier or a paddle drier, or a vacuum dryer. The polyester raw materials are dried as described above, then melted at a temperature of 200 to 300° C. and extruded into a film, using an extruder. At the extrusion, an existing arbitrary method, such as a T-die method, a tubular method or the like can be adopted.

Moreover, the extruded sheet-like molten resin is quenched to obtain an unstretched film. As a method for quenching a molten resin, a method of substantially obtaining an unoriented resin sheet by casting a molten resin on a rotary drum from a spinneret, to quench and solidify the cast resin can be suitably adopted. Preferable production method is as follows.

In order to achieve the purpose of the present invention, the main shrinkage direction of the film may be either the vertical (longitudinal) direction or the horizontal (width) direction of the film, or the film may be a vertically and horizontally balanced shrinkage type. Hereinbelow, a horizontal stretching-vertical stretching method, that performs, first, horizontal stretch, and next, vertical stretch, will be described, but a vertical stretching-horizontal stretching method in which the order is reversed may be used since only the main shrinkage direction is changed.

First, stretching in the horizontal direction is performed. It is preferred to perform stretching in the horizontal direction about 3.5 to 5 times at 65° C. to 85° C., in the state that both ends in the width direction of the film in a tenter (first tenter) are gripped by clips. Before performing stretching in the horizontal direction, it is preferred to perform preliminary heating, and preliminary heating is preferably performed until the surface temperature of the film reaches 70° C. to 100° C.

After horizontal stretching, it is preferred to allow the film pass through an intermediate zone in which active heating operation is not performed. When there is a temperature difference between the horizontal stretch zone of the first tenter and the intermediate heat treatment zone, heat in the intermediate heat treatment zone (hot blast itself, and radiant heat) flows into a horizontal stretch step, and the temperature in the horizontal stretch zone is not stable, thus film quality may not be stable. Therefore, it is preferred to allow the film after horizontal stretching and before intermediate heat treatment to pass through an intermediate zone taking a predetermined time, and then perform intermediate heat treatment. In the intermediate zone, an accompanying flow accompanying running of the film and a hot blast from the horizontal stretch zone and the intermediate heat treatment zone are blocked, such that, when a strip paper is hung in a state where the film is not allowed to pass through, the paper is almost completely hung down in the vertical direction, then a film with stable quality is obtained. About one second to five seconds of the passing time in the intermediate zone is sufficient. For shorter than one second, the length of the intermediate zone is insufficient, and the blocking effect of heat is short. Also, while the intermediate zone is preferably long, the facility becomes large when the intermediate zone is too long, thus about five seconds is sufficient.

After passing the intermediate zone, the intermediate heat treatment before vertical stretching may be either performed or not performed. However, when the temperature of the intermediate heat treatment after horizontal stretching is raised, molecular orientation contributing to folding property is relaxed, and crystallization is advanced, thus the folding property is slightly deteriorated. Also, thickness unevenness is also deteriorated. From this viewpoint, the intermediate heat treatment is preferably performed at 140° C. or less. In addition, the passing time in the intermediate heat treatment zone is preferably 20 seconds or less. While the intermediate heat treatment zone is preferably long, about 20 seconds is sufficient. Whereby, a horizontal uniaxial stretched film is obtained.

In the present invention, vertical stretching may be either performed or not performed subsequently, but is preferably performed, since the tensile breaking strength of the film is increased. Accordingly, the horizontal uniaxial stretched film is preferably introduced into a vertical stretching machine in which a plurality of roll groups is continuously arranged. In the vertical stretching, it is preferred to perform preliminary heating until the film temperature reaches 65° C. to 110° C. with a preheating roll. When the film temperature is lower than 65° C., it becomes hard to stretch the film when stretched in the vertical direction (namely, it is likely to cause breakage), thus it is not preferable. Also, when the film temperature is higher than 110° C., the film becomes easy to stick to the roll, and the roll gets dirty by continuous production faster, thus it is not preferable.

When the temperature of the film reaches the above range, vertical stretching is performed. The vertical stretch ratio is different depending on whether the main shrinkage direction is set in the vertical direction or the horizontal direction. From the viewpoint of increasing the tensile breaking strength, when the main shrinkage direction is set in the vertical direction, the vertical stretch ratio is preferably set to 2 to 5 times. On the other hand, from the viewpoint of increasing the tensile breaking strength, when the main shrinkage direction is set in the horizontal direction, the vertical stretch ratio is preferably set to 1.2 to 1.8 times.

After vertical stretching, it is preferred to once cool the film, and before performing final heat treatment, it is preferred to cool the film by a cooling roll with a surface temperature of 20 to 40° C. The film is quenched after vertical stretching, whereby the molecular orientation of the film is stabilized, and natural shrinkage rate of the film after being a product is reduced, thus it is preferred.

Next, the film after vertical stretching and cooling is introduced to a second tenter for heat treatment (relaxation treatment), and heat treatment (relaxation treatment) is performed. The relaxation treatment is a step of loosening a film in a relaxation ratio of 0% to 30%, in the state that both ends in the width direction of the film are gripped by clips. The shrinkage rate in the width direction can be changed by relaxation rate. When the relaxation rate is increased, much change is not seen in the shrinkage rate in the vertical direction, but the shrinkage rate in the horizontal direction is lowered. The lower limit of the relaxation rate is 0%, and the upper limit is 99%. However, a high relaxation rate is not preferable since there is also a disadvantage that the width of the film product becomes short. Accordingly, the upper limit of the relaxation rate is preferably about 30%.

It is preferred to reduce the heat shrinkage rate of the film by performing heat treatment after stretching in such a range that dead holding property is not severely impaired. Specifically, the heat treatment (relaxation treatment) temperature is preferably 65° C. to 150° C., and more preferably 65 to 140° C. Heat treatment doesn't make sense when the heat treatment temperature is lower than 65° C. On the other hand, when the heat treatment temperature is higher than 150° C., the film is crystallized. In the case of a transparent film, the density is likely to increase exceeding 1.33 g/cm$^3$, and it may be a film with poor dead holding property or a film with large thickness unevenness. From the viewpoint of suppressing heat shrinkage of the film under a high temperature environment, the heat treatment (relaxation treatment) temperature is more preferably 100 to 140° C., and further preferably 120 to 140° C.

Thereafter, the film is wound while cutting and removing both end parts of the film, then a film roll of a polyester film to be used in the present invention is obtained.

(Laminated Film)

The film of the present invention is not limited to a monolayer film, and may be a laminated film obtained by laminating a plurality of resin films, as long as the twist holding angle is 400 degrees or more. The resin film to be laminated may be the same resin film or a different resin film.

(Application)

The film of the present invention can be used to package an object, and particularly can be used to package a strongly odorous object, such as used diaper, filth of humans and animals, vomit, kimchi, and kusaya. An odor can be prevented from being diffused in surroundings only by placing a strongly odorous object at the center of a film, and twisting the film such that the whole object is wrapped with the film. Also, the film of the present invention having twist holding property can be also folded and tied, thus it is possible to prevent an odor of a strongly odorous object from being diffused in surrounding, other than the method of twisting the film.

Also, it is possible to package the strongly odorous object, using a packaging bag formed into a bag by heat sealing the film of the present invention. In addition, a plurality of the packaging bags and diapers can be made into a diaper set.

The present application claims the benefit of priority to Japanese patent application No. 2014-243693 filed on Dec. 2, 2014 and Japanese patent application No. 2015-103393 filed on May 21, 2015. The entire contents of the specifications of Japanese patent application No. 2014-243693 and No. 2015-103393 are hereby incorporated by reference.

Examples

Hereinafter, the present invention will be described more specifically with reference to examples, but the present invention is not limited to the following examples. The present invention can also be carried out by appropriate modifications in a range that can fall within the foregoing and following gists, and all such appropriate modifications are encompassed in the technical scope of the present invention.

Physical property measuring methods for films obtained in each of examples and comparative examples are as described below.

(Twistability)

A film was cut out in 30 cm×30 cm square, a tennis ball with a diameter of 6.6 cm was placed at the center, and before twisting a film, a toothpick was lightly fixed to a twisted part with a commercially available cellophane tape. Thereafter, the tennis ball was wrapped, and the film was clockwise-twisted 1.5 times (540 degrees) (twist packaging was carried out). After leaving it in an environment of 23° C. and 50% RH for 1 hour, an angle at which the toothpick was rotated clockwise with a state before twisting as a reference was measured, and used as a twisting angle (twist holding angle).

The above twist packaging was carried out 3 times to measure twist holding angle, and the average value thereof was calculated, and evaluated by the following standard.

○: Twist holding angle of 400 degrees or more
x: Twist holding angle of less than 400 degrees (Evaluation of Aroma Retaining Property)

Using a film, a bag was prepared by heat sealing (three-sided sealing) the inner layer surfaces of the film so that the inside dimension of the bag was 50 mm×50 mm. Into that bag was inserted an absorbent cotton impregnated with 0.2 cc of each test perfume shown below, and the bag was hermetically packaged. This bag was subsequently put into a 100 ml glass bottle, and the bottle was covered with a lid and hermetically sealed. This glass bottle was left under a normal temperature condition of 25° C., and the lid was opened after 1 hour, then odor sensory test in the glass bottle was performed. In the odor sensory test, the following three-grade sensory evaluation was performed for the presence or absence of sensing the smell of the perfume by the same 5 panelists.

○: No smell was sensed
Δ: Smell was slightly sensed
x: Smell was sensed

Four essences of strawberry essence, orange essence, apple essence and vanilla essence manufactured by KOBAYASHI PERFUMERY CO., LTD. were used as the perfume, and aroma retaining property (odor suppressing effect) was evaluated for each perfume.

(Fold Holding Angle (Dead Holding Property))

A film was left in a thermostatic chamber under an environment of 20° C. and 50% RH for 24 hours. Thereafter, the film was immediately cut into a 10 cm×10 cm square in an environment of 20° C. and 65% RH, lightly folded in two, and further lightly folded in two (a state that 5 cm×5 cm squares were overlapped), and 0.5 kg load was applied thereon with a test sealer for 1 second. Then, as shown in the FIGURE, sample 1 folded in four was put on glass plate 2 so that four corners of sample 1 were in contact with glass plate 2 or located near glass plate 2 (the apex of the folds (a center of sample 1 before folded in four) was located away from glass plate 2), and after the lapse of 1 minute, angle 3 at which the folded film opened (the state completely folded was defined as 0 degree) was measured to obtain a fold holding angle. Also, the fold holding angles were measured in both the vertical direction and the horizontal direction of the film, and the value of the larger angle was used as the fold holding angle. In the measurement of the fold holding angle, in a case of a film sample in which the vertical direction and the horizontal direction of the film were unclear, one direction was temporarily set as the vertical direction, and a direction orthogonal to the temporary vertical direction was used as a temporary horizontal direction.

(Heat Shrinkage Rate)

The film was cut into a 10 cm×10 cm square, and immersed in hot water at 95° C.±0.5° C. in a no-load condition for 10 seconds, to be heat-shrunk. Thereafter, the film was immersed in water at 25° C.±0.5° C. for 10 seconds, and taken out from water, and the dimensions in the vertical and horizontal directions of the film were measured, and the heat shrinkage rate was each obtained in accordance with the following formula (I).

$$\text{Heat shrinkage rate} = \{(\text{Length before shrinkage} - \text{Length after shrinkage})/\text{Length before shrinkage}\} \times 100 (\%) \quad \text{Formula (I)}$$

(Film Forming of Polyester Film No. 1)

Polyesters A to D are polyesters obtained by reacting acid components and polyhydric alcohol components listed in Table 1 below, and a lubricant contained in Polyester D is Sylysia (registered trademark) 266 manufactured by Fuji Silysia chemical Ltd. Polyester Film No. 1 was prepared using Polyesters A to D. The method for forming a film will be described below.

TABLE 1

| | Composition of raw materials of the polyester (% by mol) | | | | | | |
|---|---|---|---|---|---|---|---|
| | Acid Component | Polyhydric Alcohol Component | | | | Intrinsic | Additive amount of |
| Polyester | terephthalic acid | ethylene glycol | 1,4-butanediol | neopentyl glycol | diethylene glycol | Viscosity (dl/g) | Lubricant (ppm) |
| A | 100 | 99 | — | — | 1 | 0.75 | — |
| B | 100 | 68 | — | 30 | 2 | 0.72 | — |
| C | 100 | — | 100 | — | — | 1.20 | — |
| D | 100 | 99 | — | — | 1 | 0.75 | 7000 |

Polyesters A to D were mixed in a mass ratio of 5:66:24:5, and charged into an extruder. Thereafter, the mixed resin was melted at 280° C. and extruded from a T-die, then wound around a rolling metal roll cooled to a surface temperature of 30° C. to be quenched to obtain an unstretched film with a thickness of 240 μm. The take-off speed of the unstretched film (the rotational speed of the metal roll) at that time was about 20 m/min. Thereafter, the unstretched film was guided to a tenter (first tenter) in which a horizontal stretch zone, an intermediate zone and an intermediate heat treatment zone were continuously provided. In the intermediate zone, a hot blast from the horizontal stretch zone and a hot blast from the intermediate heat treatment zone are blocked, such that, when a strip paper is hung in a state where the film is not allowed to pass through, the paper is almost completely hung down in the vertical direction.

Then, the unstretched film guided to the tenter was preliminary heated until the film temperature reached 80° C., then stretched to 4 times in the horizontal direction at 70° C. in the horizontal stretch zone, and allowed to pass through an intermediate zone (passing time=about 1.2 seconds), followed by guiding the film to an intermediate heat treatment zone, and heat-treating the film at a temperature of 80° C. over 8 seconds, thereby obtaining a horizontal uniaxial stretched film with a thickness of 36 μm.

Furthermore, the horizontally stretched film was guided to a vertical stretching machine in which a plurality of roll groups was continuously arranged, and preliminarily heated until the film temperature reached 70° C. on a preheating roll, then stretched to 3 times. Thereafter, the vertically stretched film was forcibly cooled by a cooling roll set at a surface temperature of 25° C.

Then, the cooled film was guided to a tenter (second tenter), and heat-treated in the second tenter in an atmosphere at 140° C. over 10 seconds, then cooled, and both end parts were cut and removed, thereby continuously forming a biaxially stretched film with a thickness of about 20 μm over a prescribed length to obtain Polyester Film No. 1 (hereinafter, referred to as Film No. 1).

A resin composition forming Film No. 1 comprises a polyester resin. In addition, in Film No. 1, the total amount of units derived from a polyhydric alcohol other than ethylene glycol and units derived from a polycarboxylic acid other than terephthalic acid is 20% in 100% by mol of the total constituent units, and neopentyl glycol and diethylene glycol are contained, thus amorphous components are contained in Film No. 1. Also, the density of Film No. 1 is 1.32 g/cm$^3$.

(Film Forming of Polyester Film No. 2)

Polyester Film No. 2 with a thickness of 30 μm was obtained in almost the same manner as Film No. 1, except for changing the discharge amount of the molten resin in melt extrusion, in the film forming of Film No. 1.

A resin composition forming Film No. 2 comprises a polyester resin. In addition, in Film No. 2, the total amount of units derived from a polyhydric alcohol other than ethylene glycol and units derived from a polycarboxylic acid other than terephthalic acid is 20% in 100% by mol of the total constituent units, and neopentyl glycol and diethylene glycol are contained, thus amorphous components are contained in Film No. 2. Also, the density of Film No. 2 is 1.32 g/cm$^3$.

(Film Forming of Polyester Film No. 3)

Polyester Film No. 3 with a thickness of 20 μm was obtained in almost the same manner as Film No. 1, except for heat-treating the film in the second tenter in an atmosphere at 90° C. over 10 seconds, in the film forming of Film No. 1.

A resin composition forming Film No. 3 comprises a polyester resin. In addition, in Film No. 3, the total amount of units derived from a polyhydric alcohol other than ethylene glycol and units derived from a polycarboxylic acid other than terephthalic acid is 20% in 100% by mol of the total constituent units, and neopentyl glycol and diethylene glycol are contained, thus amorphous components are contained in Film No. 3. Also, the density of Film No. 3 is 1.32 g/cm$^3$.

(Film Forming of Polyester Film No. 4)

Polyester Film No. 4 with a thickness of 12 μm was obtained in almost the same manner as Film No. 3, except for changing the discharge amount of the molten resin in melt extrusion, in the film forming of Film No. 3.

A resin composition forming Film No. 4 comprises a polyester resin. In addition, in Film No. 4, the total amount of units derived from a polyhydric alcohol other than ethylene glycol and units derived from a polycarboxylic acid other than terephthalic acid is 20% in 100% by mol of the total constituent units, and neopentyl glycol and diethylene glycol are contained, thus amorphous components are contained in Film No. 4. Also, the density of Film No. 4 is 1.32 g/cm$^3$.

Heat shrinkage rate, fold holding angle, twist holding angle, and aroma retaining property (odor suppressing effect) of Film Nos. 1 to 4 described above, a commercially available transparent polybutylene terephthalate film (CFB-1 manufactured by CORRECT CO., LTD. (hereinafter, referred to as Film No. 5)), and a commercially available transparent polyethylene film (BOS (registered trademark) manufactured by kurilon, Inc. (hereinafter, referred to as Film No. 6)) were measured, and the results were summarized in Table 2. Film Nos. 1 to 4 were defined as Examples 1 to 4, and Film Nos. 5 to 6 were defined as Comparative Examples 1 to 2. Also, the total light transmittance of the films of Examples 1 to 4 are all 40% or less.

TABLE 2

| | Brand | Kind of Film | Thickness (μm) | Heat Shrinkage Rate (95° C./10 seconds) | | Dead Holding Property | | Twistability | | Evaluation of Aroma Retaining Property | | | |
|---|---|---|---|---|---|---|---|---|---|---|---|---|---|
| | | | | Longitudinal Direction | Width Direction | Fold Holding Angle (°) | Evaluation | Twist Holding angle (°) | Evaluation | Strawberry Essence | Orange Essence | Apple Essence | Vanilla Essence |
| Example 1 | Film No. 1 | transparent polyester | 20 | 11 | 11 | 40 | ○ | 410 | ○ | ○ | ○ | ○ | ○ |
| Example 2 | Film No. 2 | transparent polyester | 30 | 11 | 11 | 42 | ○ | 400 | ○ | ○ | ○ | ○ | ○ |
| Example 3 | Film No. 3 | transparent polyester | 20 | 55 | 12 | 37 | ○ | 420 | ○ | ○ | ○ | ○ | ○ |
| Example 4 | Film No. 4 | transparent polyester | 12 | 56 | 11 | 30 | ○ | 440 | ○ | ○ | ○ | ○ | ○ |
| Comparative Example 1 | Film No. 5 | transparent polybutylene terephthalate | 20 | <2 | <2 | 62 | x | 90 or less | x | ○ | ○ | ○ | ○ |
| Comparative Example 2 | Film No. 6 | transparent polyethylene | 20 | <2 | <2 | 67 | x | 90 or less | x | x | ○ | ○ | Δ |

INDUSTRIAL APPLICABILITY

The film of the present invention has a twist holding angle measured by the method described above of 400 degrees or more, and has sufficient twist holding property. Therefore, an odor does not leak even when a strongly odorous object is packaged in the film of the present invention, and the film of the present invention is useful as a film for packaging. The film of the present invention can be used to package a strongly odorous object, such as used diaper, filth of humans and animals, vomit, kimchi, and kusaya, and suppress diffusion of odor.

The invention claimed is:

1. A film for packaging comprising a polyester-based resin film, wherein
   the resin film comprises ethylene terephthalate in an amount of more than 50% by mol, based on 100% by mol of the total constituent units of the polyester,
   the resin film comprises a polyester-based resin containing a monomer selected from neopentyl glycol, 1,4-cyclohexanedimethanol, and a combination thereof, which monomer is an amorphous component,
   the total units derived from a polyhydric alcohol other than ethylene glycol and units derived from a polycarboxylic acid other than terephthalic acid is 13% by mol or more, based on 100% by mol of the total constituent units of the polyester,
   the resin film has a density of 1.29 g/cm³ or more and 1.33 g/cm³ or less, and
   the resin film has a twist holding angle of 400 degrees or more.

2. The film for packaging according to claim 1, wherein the heat shrinkage rates in the longitudinal and width directions when the film is heat-shrunk in hot water at 95° C. for 10 seconds are 5% or more and 20% or less.

3. The film for packaging according to claim 1, wherein the resin film after being kept in an environment at 20° C. for one day has a fold holding angle of 75 degrees or less.

4. The film for packaging according to claim 1, wherein the resin film has a total light transmittance of 40% or less.

5. The film for packaging according to claim 2, wherein the resin film after being kept in an environment at 20° C. for one day has a fold holding angle of 75 degrees or less.

6. The film for packaging according to claim 5, wherein the resin film has a total light transmittance of 40% or less.

7. A packaging bag formed into a bag by heat sealing the film for packaging as defined in claim 1.

8. The packaging bag according to claim 7, for the purpose of packaging a strongly odorous object.

9. A packaging bag formed into a bag by heat sealing the film for packaging as defined in claim 2.

10. A packaging bag formed into a bag by heat sealing the film for packaging as defined in claim 3.

11. A packaging bag formed into a bag by heat sealing the film for packaging as defined in claim 4.

12. A packaging bag formed into a bag by heat sealing the film for packaging as defined in claim 5.

13. A packaging bag formed into a bag by heat sealing the film for packaging as defined in claim 6.

* * * * *